United States Patent

Lee et al.

[11] Patent Number: 6,047,048
[45] Date of Patent: Apr. 4, 2000

[54] REMOTE CONTROLLED AUTO-DIALER HANDSET

[75] Inventors: Peter Lee, Huntington Beach; George F. Cheung, La Mirada; Kenneth W. Schossow, Fountain Valley, all of Calif.

[73] Assignee: Ameriphone, Inc., Garden Grove, Calif.

[21] Appl. No.: 08/888,771

[22] Filed: Jul. 7, 1997

[51] Int. Cl.[7] .................................................. H04M 11/00
[52] U.S. Cl. .............................. 379/102.01; 379/102.02; 379/355; 379/420
[58] Field of Search ............................ 379/102.01, 420, 379/40, 102.02, 102.03, 354, 355, 356, 357

[56] References Cited

U.S. PATENT DOCUMENTS

| | | | |
|---|---|---|---|
| 4,417,100 | 11/1983 | Carlson et al. | 379/51 |
| 4,453,043 | 6/1984 | Zielinski et al. | 379/52 |
| 5,287,398 | 2/1994 | Briault | 379/38 |
| 5,457,730 | 10/1995 | Rounds | 379/40 |
| 5,457,742 | 10/1995 | Vallillee et al. | 379/352 |
| 5,548,632 | 8/1996 | Walsh et al. | 455/521 |
| 5,673,304 | 9/1997 | Connor et al. | 379/45 |
| 5,754,602 | 5/1998 | Landry et al. | 379/355 |
| 5,926,769 | 7/1999 | Valimaa et al. | 455/564 |

*Primary Examiner*—Forester W. Isen
*Assistant Examiner*—Roland G. Foster
*Attorney, Agent, or Firm*—Blakely Sokoloff Taylor & Zafman

[57] ABSTRACT

A remote controlled telephone handset that allows an end user to remotely dial one of at least two telephone numbers stored in the handset. The handset includes a receiver that receives a remote control signal and a memory circuit that is adapted to store at least two telephone numbers. The telephone handset also has a off hook and ring detection circuit that can couple the handset to a telephone line. The receiver, memory and off hook and ring detection circuit are coupled to a central processing unit which can answer an incoming call, hang up a call, or dial one of the telephone numbers in response to the receipt of a control signal(s).

6 Claims, 4 Drawing Sheets

REMOTE CONTROLLED AUTO-DIALER HANDSET

BACKGROUND OF THE INVENTION

1. Field of the Invention

The present invention relates to a remote controlled telephone handset.

2. Background Information

Operating a telephone can be difficult for someone with a physical handicap or a cognitive disorder. For example, the mere manipulation of a telephone keypad may be beyond the limitation of a para- or quadriplegic. It is therefore desirable to provide a telephone handset that is easier to operate than conventional handsets of the prior art.

U.S. Pat. No. 4,453,043 issued to Zielinski et al. and assigned to Northern Telecom Ltd. discloses a telephone handset for disabled people. The Northern Telecom unit includes a mouth switch that can be blown into by an end user to answer the phone, or automatically dial an operator. To dial a number the end user must blow into the mouth piece to obtain the operator. The user verbally provides the phone number to the operator who then dials the number. The Northern Telecom phone unit can only dial the operator. The user must still be close enough to the handset to provide verbal instructions to the operator. Para- and quadriplegic users cannot always obtain close physical access to a telephone handset. It would therefore be desirable to provide a telephone handset which allows an end user to dial a phone number without being in close proximity to the phone.

There have been disclosed other remote controlled phone systems in the prior art. For example, U.S. Pat. No. 5,457,742 issued to Vallillee et al. discloses a telephone handset that can be dialed from the keyboard of a personal computer through a radio frequency (RF) transmitter and receiver. The Vallillee system still requires the manipulation of a keypad which is not always possible for a person with a mental or physical handicap.

SUMMARY OF THE INVENTION

A remote controlled telephone handset that allows an end user to remotely dial one of at least two telephone numbers stored in the handset. The handset includes a receiver that receives a remote control signal and a memory circuit that is adapted to store at least two telephone numbers. The telephone handset also has an off hook and ring detection circuit that can couple the handset to a telephone line. The receiver, memory and off hook and ring detection circuit are coupled to a central processing unit which can answer an incoming call, hang up a call, or dial one of the telephone numbers in response to the receipt of a control signal(s).

DETAILED DESCRIPTION OF THE INVENTION

Figure 1:
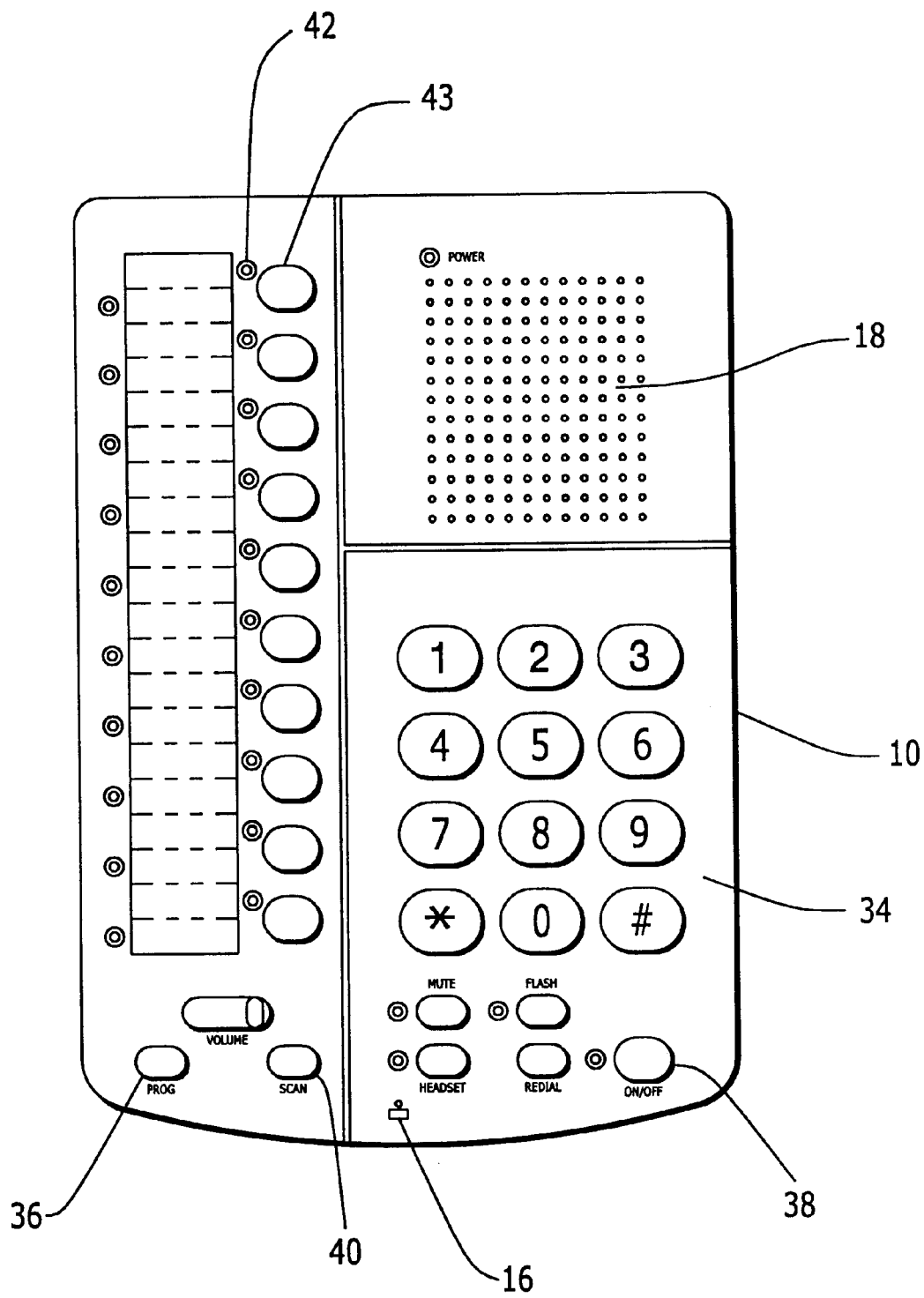
FIG. 1 is a top view of a telephone handset of the present invention.
Figure 2:
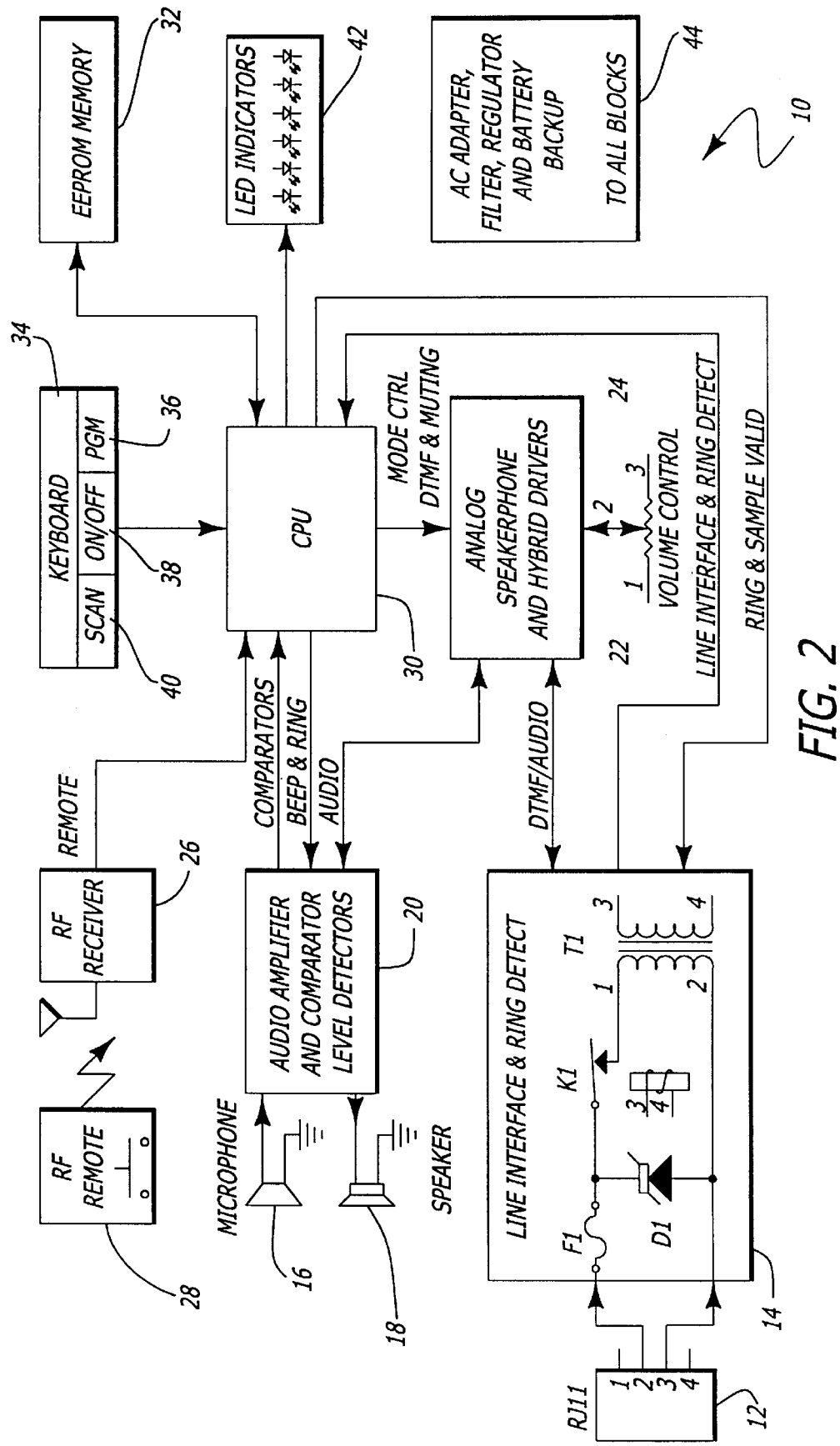
FIG. 2 is a block diagram showing the electrical elements of a telephone handset.

Referring to the drawings more particularly by reference numbers, FIGS. 1 and 2 show a telephone handset system 10 of the present invention. The handset 10 can be coupled to a public switched telephone network (PSTN) through an RJ11 jack 12. The telephone handset 10 has an off hook/ring detection circuit 14 that is coupled to the RJ11 jack 12. The off hook and ring detection circuit 14 can detect a ring voltage, and switch between an on hook state and an off hook state.

The handset 10 may also have a microphone 16 and a speaker 18 that are connected to an audio interface circuit 20. The audio interface circuit 20 contains comparators, filters, level detectors and other circuitry required to operate the microphone 16 and the speaker 18. The audio interface circuit 20 and the off hook and ring detection circuit 14 are coupled to a driver circuit 22. The driver circuit 22 can be connected to a volume control input 24.

The handset 10 may include a radio frequency (RF) receiver 26 that can receive a control signal(s) generated by a remote controller 28. The remote controller 28 typically has a button (not shown) that can be depressed by an end user to generate the control signal. The control signal may be a single pulse, or a series of pulses in accordance with a predetermined protocol. The control signal can be used to answer a call, dial a call or hang up a call. Although an RF transmitter/receiver and a microphone are shown and described, it is to be understood that other means of remotely transmitting a control signal may be used in the present invention.

The handset 10 further includes a central processing unit (CPU) 30 that is coupled to the off hook and ring detection circuit 14, the audio interface circuit 20, the driver circuit 22 and the receiver 26. The central processing unit 30 is also connected to a memory circuit 32. The memory circuit 32 is adapted to store data, instructions, etc. including data relating to at least two telephone numbers. The central processing unit 30 performs various computations utilizing the data and instructions stored within the memory device 32.

The handset 10 has a keyboard 34 which has a number of individual keypads. The keyboard 34 has numeric keypads 0–9, * and #, which allow an end user to manually dial a phone number. The keyboard 34 further includes a program PGM keypad 36 which when activated allows an end user to store telephone numbers into the memory circuit 32. By way of example, when the program keypad 36 is activated the CPU 30 enters a mode which stores all inputs from the numeric keypad into the memory circuit 32. The end user can store telephone numbers by merely entering the numbers through the numeric keypad. The memory circuit 32 has the capacity to store at least two telephone numbers. By way of example, the memory circuit could store 20 different telephone numbers. The keyboard 34 may further have an on/off switch 38, and a SCAN keypad 40 which when activated scans the various telephone numbers in response to the receipt of a control signal.

The handset 10 may have a plurality of light emitting diodes (LEDs) 42 that are associated with each telephone number stored in the memory circuit 32. The handset 10 may also have individual input buttons associated with each telephone number that allows the end user to dial one of the stored telephone numbers with a single press of a button. The telephone handset 10 may further include an AC adapter, filter, regulators and battery backup 44 required to operate the handset.

Figure 3A:
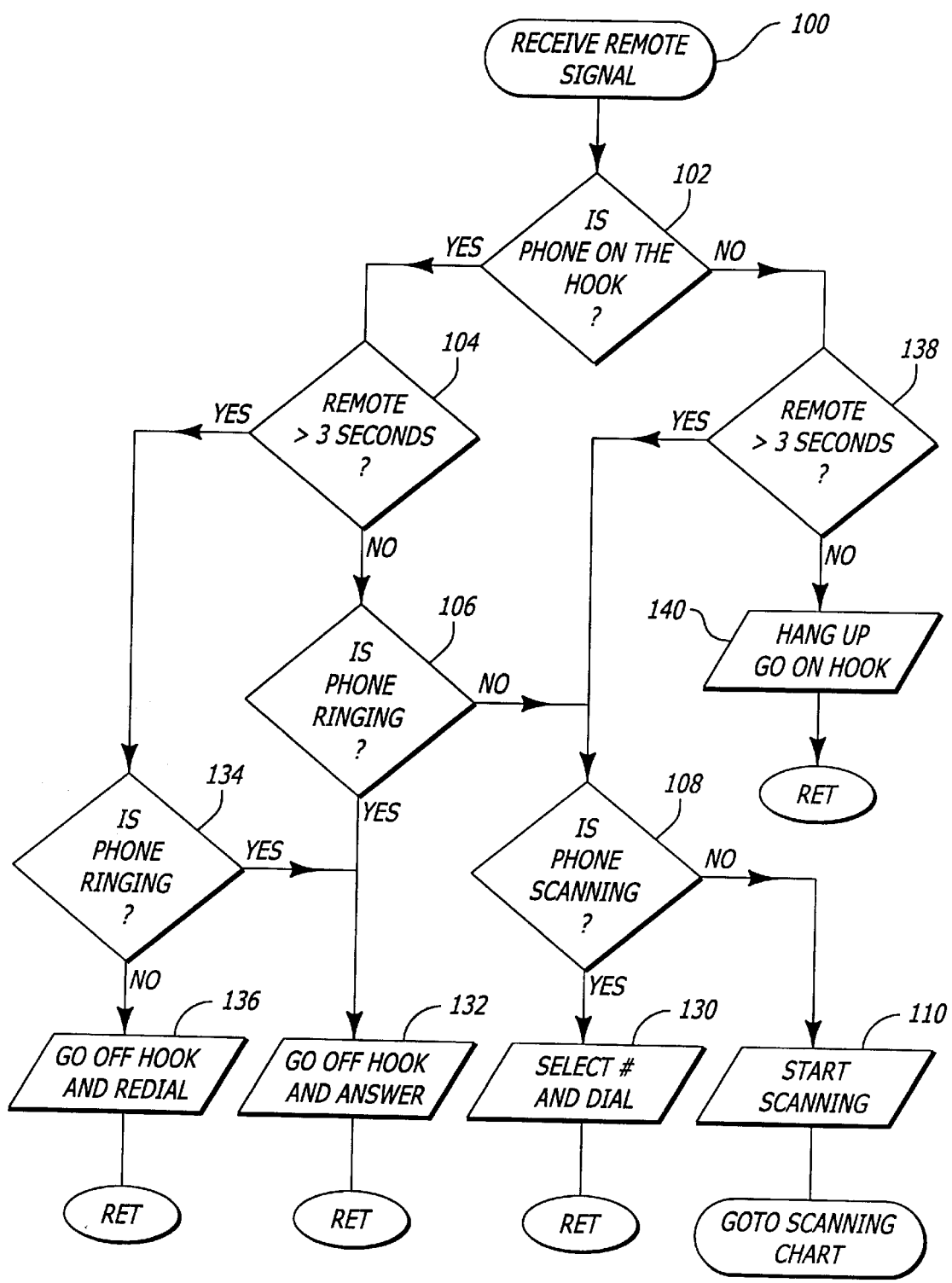
FIGS. 3a–b are a flowchart which show an operation of the telephone handset.
Figure 3B:
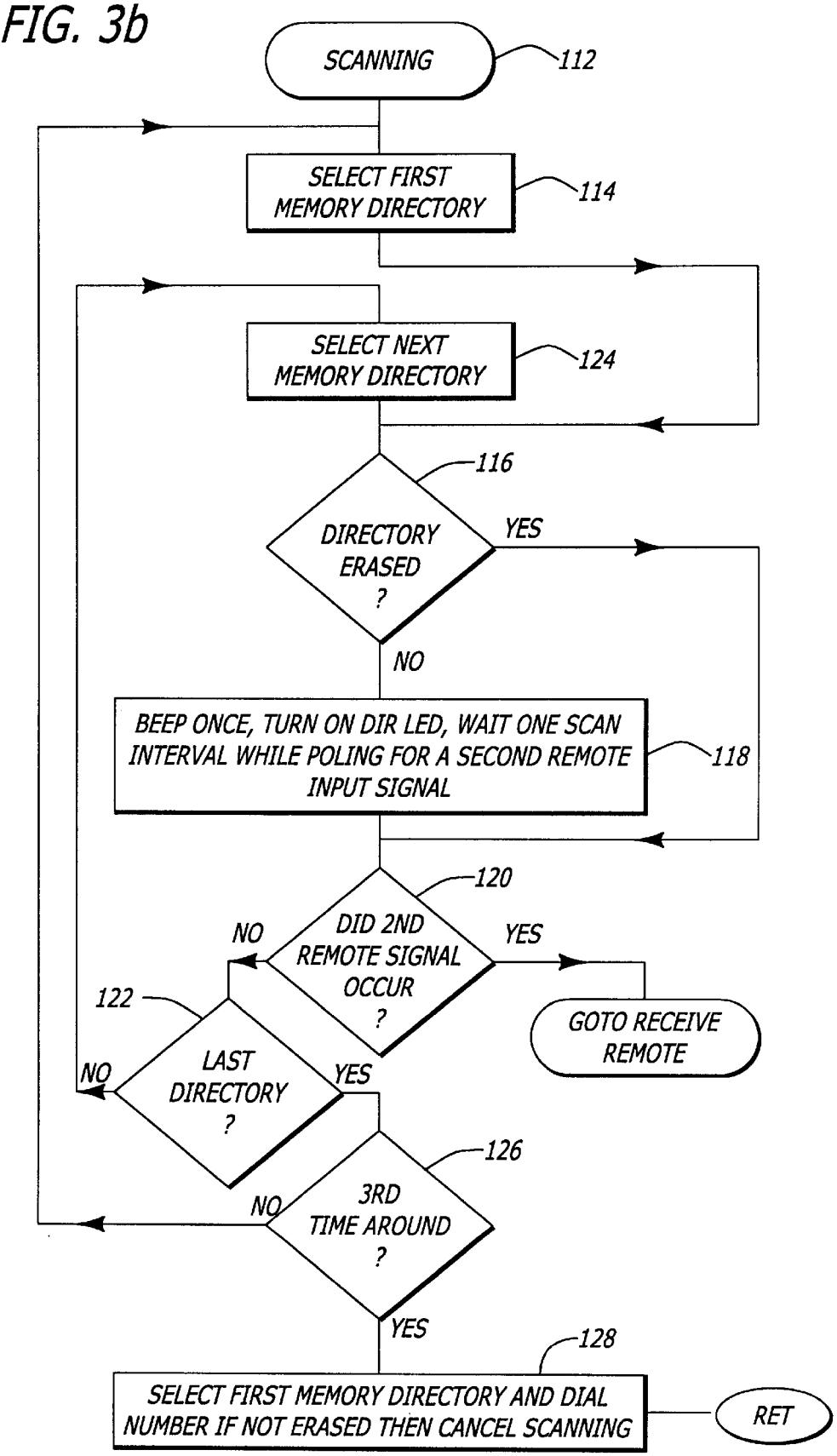

FIGS. 3a and 3b provide a flowchart which shows a software routine(s) performed by the CPU 30. The end user transmits a control signal to the receiver 26 at input block 100. The CPU 30 then determines whether the phone is on the hook in decision block 102. The CPU 30 then determines whether the control signal lasted longer than 3 seconds in decision block 104.

If the control signal was less than 3 seconds the CPU 30 determines whether the phone is ringing by sensing the off hook/ring detection circuit 14 in decision block 106. If the phone is not ringing the CPU 30 determines whether the routine is in a telephone number memory scanning mode in decision block 108. If the routine is not in a scanning mode the CPU 30 enters the scanning mode in process block 110.

Referring to FIG. 3b, the CPU 30 begins the scanning mode at input block 112 and selects the first telephone number stored within the memory circuit 32 in process block 114. The routine determines whether the number was erased in decision block 116. If the number was not erased the CPU 30 generates an audible sound through the speaker, illuminates the LED associated with the first telephone number and polls the receiver to determine whether a subsequent control signal is provided to the handset 10 in process block 118. If the phone was erased the routine skips process block 118.

The CPU 30 determines whether the subsequent control signal was generated in decision block 120. If there was not a subsequent control signal then the CPU 30 determines whether the selected telephone number is the last number in decision block 122. If the phone number is not the last directory the routine returns to process block 124 to select the next phone number stored in the memory circuit 32. The CPU 30 may poll for the receipt of the subsequent control signal within a predetermined time interval that may be programmable by the end user.

If the phone number is the last directory then the CPU 30 decides whether the numbers have been scanned three times in decision block 126. If not the routine returns to process block 114. If the CPU 30 has scanned the numbers three times the routine moves to process block 128 wherein the handset dials the first telephone number, unless the first number has been erased, wherein the routine will discontinue the scanning function. Although scanning through the telephone numbers three times is shown and described, it is to be understood that the number of scans can be programmed to a different number such as 2, 4, etc.

If the end user provides a subsequent control signal at decision block 120 the routine returns to input block 100. The process then moves to decision block 108 wherein the CPU 30 determines that the routine is in the scanning mode and moves to process block 130 wherein the handset dials the telephone number selected when the end user generated the subsequent control signal. The end user can thus dial one of the telephone numbers stored in memory by generating a control signal to enter the scan mode and then generate another control signal when the scanner reaches the desired telephone number.

The handset of the present invention also allows the end user to remotely perform other functions such as answering a call. Referring to FIG. 3a, if the CPU 30 determines that the phone is ringing in decision block 106 the routine proceeds to process block 132 where the CPU 30 drives the off hook and ring detection circuit 14 to the off hook state and the handset answers the call. Additionally, if the control signal is determined to be longer than three seconds the routine proceeds to decision block 134 to determine if the phone is ringing. If the phone is ringing the routine continues to process block 132. If the phone is not ringing the routine continues to process block 136, wherein the CPU 30 switches the circuit 14 to the off hook state and redials a telephone number. The time interval of the control signal may be dependent upon the amount of time that the end user depresses the button of the remote controller 28.

If the CPU 30 determines that the phone is not on the hook in block 102 the routine continues to decision block 138 to determine whether the control signal was longer than three seconds. If the control signal was longer than three seconds the routine proceeds to block 108. If the signal was less than three seconds the routine continues to process block 140 where the CPU drives the off hook and ring detection circuit 14 to an on hook state.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A remote controlled telephone handset that is coupled to a telephone line and can be operated with a remote control signal, comprising:

a receiver that receives the remote control signal;

a memory device that is adapted to contain a first telephone number and a second telephone number;

an off hook and ring detection circuit that is coupled to the telephone line; and, a central processing unit that is coupled to said memory device, said receiver and said off hook and ring detection circuit, said central processing unit scans said memory device upon the receipt of the remote control signal, said central processing unit initiates a dialing of the first telephone number if a subsequent remote control signal is received within a predetermined time interval and initiates a dialing of the second telephone number if the subsequent remote control signal is not received within the predetermined time interval.

2. The handset as recited in claim 1, further comprising a remote controller that transmits the remote control signal.

3. The handset as recited in claim 2, wherein said receiver is a radio frequency receiver that receives the remote control signal.

4. The handset as recited in claim 1, wherein said central processing unit switches said off hook and ring detection circuit to an off hook state when said receiver receives at least one remote control signal.

5. The handset as recited in claim 1, wherein said central processing unit switches said off hook and ring detection circuit to an on hook state when said receiver receives at least one remote control signal.

6. A method for remotely dialing a telephone number, comprising:

a) sending a remote control signal;

b) receiving said remote control signal; and, c) scanning a first telephone number and a second telephone number that are stored in a memory device;

d) dialing the first telephone number if a subsequent remote control signal is sent and received within a predetermined time interval; and, e) dialing the second telephone number if the subsequent remote control signal is not received within the predetermined time interval.

* * * * *